United States Patent
Khsiba et al.

(10) Patent No.: US 10,284,334 B2
(45) Date of Patent: May 7, 2019

(54) METHODS AND DEVICES FOR SEQUENTIAL SPHERE DECODING

(71) Applicant: INSTITUT MINES-TELECOM, Paris (FR)

(72) Inventors: Mohamed-Achraf Khsiba, Paris (FR); Ghaya Rekaya Ben-Othman, Antony (FR)

(73) Assignee: INSTITUT MINES-TELECOM, Paris (FR)

( * ) Notice: Subject to any disclaimer, the term of this patent is extended or adjusted under 35 U.S.C. 154(b) by 0 days.

(21) Appl. No.: 15/475,400

(22) Filed: Mar. 31, 2017

(65) Prior Publication Data
US 2017/0294986 A1  Oct. 12, 2017

(30) Foreign Application Priority Data
Apr. 6, 2016  (EP) .................................... 16305401

(51) Int. Cl.
| | |
|---|---|
| *H04L 5/00* | (2006.01) |
| *H04L 1/00* | (2006.01) |
| *H04L 25/03* | (2006.01) |
| *H04L 25/02* | (2006.01) |
| *H04B 7/0413* | (2017.01) |

(52) U.S. Cl.
CPC .......... *H04L 1/0054* (2013.01); *H04L 1/0048* (2013.01); *H04L 5/006* (2013.01); *H04L 25/0242* (2013.01); *H04L 25/03242* (2013.01); *H04B 7/0413* (2013.01)

(58) Field of Classification Search
CPC ..... H04L 1/0054; H04L 1/0048; H04L 5/006; H04L 25/02
See application file for complete search history.

(56) References Cited

U.S. PATENT DOCUMENTS

2012/0045024 A1* 2/2012 Cui .................... H04L 1/005
                                                          375/341

FOREIGN PATENT DOCUMENTS

| JP | 2008-505544 A | 2/2008 |
|---|---|---|
| WO | WO2006004706 A1 | 1/2006 |

OTHER PUBLICATIONS

E. Viterbo and J. Boutros, "A universal lattice code decoder for fading channels", IEEE Transactions on Information Theory, 45(5):1639-1642, Jul. 1999.

(Continued)

*Primary Examiner* — Jaison Joseph
(74) *Attorney, Agent, or Firm* — Meagher Emanuel Laks Goldberg & Liao, LLP

(57) ABSTRACT

Embodiments of the invention provide a decoder for decoding a signal received through a transmission channel in a communication system, said signal comprising a vector of information symbols, said transmission channel being represented by a channel matrix, wherein the decoder comprises:

an initial radius determination unit (307) configured to determine an initial radius;

a symbol estimation unit (309) configured to iteratively determine a current radius to search a lattice point inside a current spherical region defined by said current radius, said current radius being initially set to said initial radius, said symbol estimation unit (309) being configured, for each lattice point found in said current spherical region, to store said lattice point in association with a metric, said symbol estimation unit (309) being further configured to update said current radius using a linear function, said linear function having a slope parameter strictly inferior to one, (Continued)

The decoder being configured to determine at least one estimate of said vector of information symbols from at least one of the lattice points found by the symbol estimation unit (309).

17 Claims, 6 Drawing Sheets

(56) References Cited

OTHER PUBLICATIONS

R. Fano. "A heuristic discussion of probabilistic decoding", IEEE Transactions on Information Theory, 9(2):64-74, 1963.
G.R. Ben-Othman, R. Ouertani, and A. Salah, "The spherical bound stack decoder", In Proceedings of International Conference on Wireless and Mobile Computing, pp. 322-327, Oct. 2008.
W. Zhao and G.B. Giannakis, "Sphere Decoding Algorithms with Improved Radius Search", IEEE Transactions on Communications, 53(7):1104-1109, Jul. 2005.
W. Zhao and G.B. Giannakis, "Reduced Complexity Closest Point Decoding Algorithms for Random Lattices", IEEE Transactions on Wireless Communications, 5(1):101-111, Jan. 2006.
European Search Report for 16305401.8 dated Oct. 4, 2016.
Xu W et al: Efficient restarted radius bisection algorithm for sphere decoding with applications to multiple-in multiple-out systems, IET Communications, The Institute of Engineering and Technology, GB, vol. 6, No. 18, Dec. 18, 2012 (Dec. 18, 2012), pp. 3140-3149.
KR Office Action issued in corresponding KR application No. 10-2017-0043013 dated Jul. 5, 2018.

\* cited by examiner

METHODS AND DEVICES FOR SEQUENTIAL SPHERE DECODING

TECHNICAL FIELD

The invention generally relates to digital communication and in particular to methods and devices for decoding a data signal.

BACKGROUND

The 'smart revolution' has made significant changes in all aspects of modern lives including communications, business, health services and education. From smart phones, smart watches and smart cars to smart homes and smart cities, an increasing number of smart devices are being massively used and changing the ways we communicate, exchange information, make business, travel and spend leisure time.

With the advent of these web-enabled and connected devices, there is a growing need for more system capacity improvements to meet the needs of end users. Multiple-input multiple-output (MIMO) technologies were developed to increase such system capacity and offer better link reliability.

The promise of high data throughput and improved coverage range, reliability and performance is achieved by MIMO systems through the use of multiple transmit and receive antennas for communicating data streams. The use of a multiplicity of transmit and receive antennas increases immunity to propagation effects comprising interference, signal fading and multipath. These key potential benefits of MIMO technologies make them ideal candidates in many wired, wireless and optical communication systems applied for example in local and wide area networks. Local area network applications comprise the Wi-Fi standard. Exemplary applications in wide area networks comprise cellular mobile networks as standardized in 3G, 4G, LTE and future 5G.

Single user wireless MIMO systems form the basic configurations of multiple antenna technologies. They comprise a pair of transmitter/receiver each equipped with a multiplicity of antennas. At the transmitter side, a Space-Time (ST) encoder may be implemented to encode and transmit the different streams carrying original data in the form of information symbols through the different transmit antennas during different time slots. At the receiver side, a Space-Time decoder may be implemented to decode the conveyed signals from the transmitter in order to recover the original data.

In addition to the single user wireless MIMO configurations, Space-Time coding and decoding techniques may be implemented in wireless transceivers operating in multiple user networks. Exemplary applications of wireless multiuser MIMO systems comprise cellular communications and wireless sensor networks used for example in smart homes. In such applications, ST coding and decoding techniques may be combined with multiple access techniques such as Time Division Multiple Access (TDMA), Frequency Division Multiple Access (FDMA), Code Division Multiple Access (CDMA), and Space-Division Multiple Access (SDMA).

In still another application of MIMO technologies, ST coding and decoding techniques may be adopted in optical fiber-based communications. In such applications, an optical transmitter may implement a ST encoder to distribute data flows over the polarization states of the electrical field of the optical wave or over the different propagation modes in the presence of a multi-mode optical fiber. An optical receiver may implement a ST decoder to recover the transmitted data by the optical transmitter. The use of ST coding and decoding techniques in optical communications may enable for providing high transmission rates over long distances and mitigating dispersion losses and impairments of the optical transmission medium.

Whether in wireless or optical communications applications, ST coding and decoding techniques may be combined with multicarrier modulation techniques. This is the case in the examples of OFDM-MIMO and FBMC-MIMO systems based respectively on OFDM (Orthogonal Frequency Division Multiplexing) and FBMC (Filter Bank Multi-Carrier) modulations for mitigating frequency-selectivity, interference and delays.

An important challenge of MIMO communication systems relates to the complexity and energy consumption of the signal processing at transceiver devices. In particular, a major and demanding challenge concerns the development of Space-Time decoders that provide optimal decoding performance while requiring low computational complexity and energy consumption.

A Space-Time decoder implemented in a receiver device is configured to determine, from the received signal and a channel matrix, an estimation of the originally conveyed information symbols. The decoder performs a comparison between the received signal and the possible values of the transmitted vector of information symbols. In the presence of equally probable information symbols, optimal decoding performance is obtained by applying the Maximum Likelihood (ML) decoding criterion. An ML decoder provides optimal performance in terms of the probability of decoding error and the achievable transmission rates.

The ML estimation problem can be solved using two different but equivalent representations of the MIMO system: a lattice representation and a tree representation.

Using the lattice representation, a MIMO system may be associated with a lattice generated by the channel matrix. Each possible value of the vector of information symbols may be represented by a point in this lattice. The received signal may be seen as a point of this lattice disturbed by a noise vector. Solving for the ML solution thus amounts to solve a closest vector problem in the lattice of a generator matrix the channel matrix. The ML solution corresponds in this case to the nearest lattice point to the received signal in the sense of the minimization of the Euclidean Distance. The computational complexity of finding the ML solution depends on the number of examined lattice points during the search.

In practice, solving the closest vector problem may be performed through a search in a decoding tree obtained through a QR decomposition of the channel matrix. Each possible value of the vector of information symbols may be represented by a path in the decoding tree. Each path being associated with a metric designating the Euclidean Distance between the received signal and the signal corresponding to the vector of information symbols associated to this path. In this case, solving for the ML solution reduces to solve for the path in the decoding tree having the lowest metric. The computational complexity of the tree-search is proportional to the number of visited nodes during the tree-search which depends on the number of nodes at each level and the total number of levels of the decoding tree.

Based on these two representations, several implementations of ML ST decoders have been proposed. A basic decoding method uses an exhaustive search to find the ML solution. Although they provide optimal performance, exhaustive search-based implementations require intensive processing and storage capabilities that may exceed the available ones, in particular in the presence of high-dimensional modulation schemes and/or high number of antennas in both ends of the MIMO system.

Alternatively, ML sequential decoding schemes may be implemented to provide optimal performance while requiring fewer computational and storage resources than the exhaustive search-based methods. Based on the tree representation of the MIMO system, ML sequential decoders may be categorized into three classes depending on whether they use a depth-first, a breadth-first or a best-first tree-search strategy.

Depth-first strategy-based sequential decoders comprise the Sphere decoder disclosed for example in "E. Viterbo and J. Boutros, A universal lattice code decoder for fading channels, IEEE Transactions on Information Theory, 45(5): 1639-1642, July 1999".

Breadth-first strategy-based sequential decoders comprise the Stack decoder disclosed for example in "R. Fano. A heuristic discussion of probabilistic decoding, IEEE Transactions on Information Theory, 9(2):64-74, 1963".

Best-first strategy-based sequential decoders comprise the SB-Stack decoder disclosed for example in "G. R. Ben-Othman, R. Ouertani, and A. Salah, The spherical bound stack decoder, In Proceedings of International Conference on Wireless and Mobile Computing, pages 322-327, October 2008".

Depth-first-based decoders, in particular the Sphere decoder, are among the widely used ML sequential decoders. Using the lattice representation of the MIMO system, the Sphere decoder reduces the search space for the ML solution to a spherical region centered at the point representing the received signal (which is not a lattice point). Departing from an initial sphere radius value, the Sphere decoder searches for a first lattice point associated with one of the possible values of the vector of information symbols (also referred to hereinafter as a 'valid lattice point') inside a spherical region having a radius equal to the initial sphere radius. Upon finding a valid lattice point, the value of the sphere radius is updated to the value of the Euclidean distance between the lattice point found in the spherical region and the point representing the received signal. This sphere-constrained search and the radius update are performed iteratively until finding the ML solution which corresponds to the smallest sphere that comprises a valid lattice point and that is centered at the point representing the received signal.

This search space limitation may be seen, using the tree representation of the MIMO system, as a limitation of the number of visited nodes in the tree. The radius of the spherical search region determines bound limits on the visited nodes at each level of the decoding tree. Only nodes that belong to the intervals imposed by these bound limits are visited during the tree-search process. Limiting the search space under the Sphere decoding strategy enables a reduction on the computational complexity of searching for the ML solution compared to some sequential decoders such as the Stack decoder.

Solutions to reduce the complexity of the Sphere decoder have been explored from various angles. For example, a method for selecting the initial radius has been proposed in "W. Zhao and G. B. Giannakis, Sphere Decoding Algorithms with Improved Radius Search, IEEE Transactions on Communications, 53(7):1104-1109, July 2005". Reordering techniques for speeding up the convergence of the Sphere decoding through rearranging the components of the channel matrix have been disclosed for example in "W. Zhao and G. B. Giannakis, Reduced Complexity Closest Point Decoding Algorithms for Random Lattices, IEEE Transactions on Wireless Communications, 5(1):101-111, January 2006".

Although such solutions provide implementations of the Sphere decoding algorithm with reduced complexity, their common radius update method may not be sufficient in the presence of high dimensional and/or dense lattices. It may induce an increasing computational complexity in addition to longer delays for the convergence of the decoding process. There is thus a need for radius updating techniques which enable a fast decoding convergence and reduced decoding complexity, especially for high-dimensional systems involving a high number of transmit and/or receive antennas.

SUMMARY

In order to address these and other problems, there is provided a decoder for decoding a signal received through a transmission channel in a communication system. The signal comprises a vector of information symbols. The transmission channel is represented by a channel matrix. The decoder may comprise:
- an initial radius determination unit configured to determine an initial radius;
- a symbol estimation unit configured to iteratively determine a current radius to search a lattice point inside a current spherical region defined by the current radius. The current radius is initially set to the initial radius. The symbol estimation unit may be configured, for each lattice point found in the current spherical region, to store the lattice point in association with a metric. The symbol estimation unit may be further configured to update the current radius using a linear function. The linear function may have a slope parameter strictly inferior to one. The decoder maybe configured to determine at least one estimate of said vector of information symbols from at least one of the lattice points found by the symbol estimation unit.

According to one aspect of the invention, the symbol estimation unit may be configured to determine an update of the current radius by applying a linear function to the metric associated with the last found lattice point depending on whether a lattice point is found inside the current spherical region or not. More specifically:
- if a lattice point is found in the current spherical region, the symbol estimation unit may be configured to apply the linear function to the metric associated with the found lattice point, which provides the updated current sphere radius,
- if no lattice point is found in the current spherical region, the symbol estimation unit may be configured to apply the linear function to the sum of the metric associated with the last found lattice point and the value of the current radius, which provides the updated current sphere radius.

According to certain embodiments, the linear function used to update the current sphere radius may be a linear function having a slope parameter $\alpha$ strictly inferior to one. In a particular embodiment referred to as "dichotomy-based radius update", the slope parameter $\alpha$ may be advantageously equal to one half ($\frac{1}{2}=0.5$) enabling a fast convergence of the search of the ML solution and a computational complexity reduction.

According to one aspect of the invention, the decoder may comprise a storage unit configured to store each found lattice point during the search for the ML solution with the Euclidean distance between this found lattice point and a real value of the received signal.

According to certain embodiments, the initial radius determination unit may be configured to determine the initial sphere radius based on at least one parameter chosen in a group consisting of the noise variance of the channel additive noise and a predefined number of target lattice points.

According to certain embodiments, the predefined number of target lattice points may depend on the signal-to-noise ratio.

In an application of the invention to soft-output decoding, the predefined number of target lattice points may be determined based on at least one soft-output decision reliability metric related to the log-likelihood ratio values of the information bits carried by the information symbols.

In certain embodiments, the symbol estimation unit may be configured to search a lattice point inside a current spherical region defined by the current radius using a sequential decoding algorithm and an upper triangular matrix determined by performing a QR decomposition of the channel matrix.

Further, according to certain embodiments, the decoder may be configured to perform a preprocessing on the channel matrix. The preprocessing may be chosen in a group consisting of a permutation of rows and/or columns, a lattice reduction and MMSE-GDFE filtering.

There is also provided a receiver for receiving and decoding a vector of information symbols. The receiver may comprise a decoder according to any preceding feature for decoding a vector of information symbols.

In one application of the invention in wireless multiple-input multiple-output communication systems, there is provided a wireless device capable of receiving data. The wireless device comprises a receiver for receiving and decoding a vector of information symbols according to any of the preceding embodiments.

In one application of the invention in optical multiple-input multiple output communication systems, there is provided an optical device capable of receiving data. The optical device comprises a receiver for receiving and decoding a vector of information symbols according to any of the preceding embodiments.

The invention also provides a method of decoding a signal received through a transmission channel in a communication system. The signal comprising a vector of information symbols. The transmission channel being represented by a channel matrix. The method comprising:
  determining an initial radius;
  iteratively determining a current radius to search a lattice point inside a current spherical region defined by the current radius. The current radius being initially set to the initial radius. The method comprising, for each lattice point found in the current spherical region, storing the lattice point in association with a metric.

The method further comprises updating the current radius using a linear function. The linear function having a slope parameter strictly inferior to one. The method further comprises determining at least one estimate of the vector of information symbols from at least one of the found lattice points.

There is also provided a computer program product for decoding a signal received through a transmission channel in a communication system. The signal comprising a vector of information symbols. The transmission channel being represented by a channel matrix. The computer program product comprising:
  a non-transitory computer readable storage medium, and instructions stored on the non-transitory computer readable storage medium that, when executed by a processor, cause the processor to:
    determine an initial radius;
    iteratively determine a current radius to search a lattice point inside a current spherical region defined by the current radius. The current radius being initially set to the initial radius. The computer program product being caused, for each lattice point found in the spherical region, to store the lattice point in association with a metric. The processor being further caused to update the current radius using a linear function. The linear function having a slope parameter strictly inferior to one.

The processor being caused to determine at least one estimate of the vector of information symbols from at least one of the found lattice points.

Advantageously, the various embodiments allow reducing the complexity of spherical-based sequential ML decoders without compromising the decoding error performance.

Further, the various embodiments allow accelerating the convergence of sequential decoding by reducing the number of visited lattice points during the search for the ML solution.

Further advantages of the present invention will become clear to the skilled person upon examination of the drawings and the detailed description. It is intended that any additional embodiments be incorporated herein.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serves to explain the embodiments of the invention.

DETAILED DESCRIPTION

Embodiments of the present invention provide methods, devices and computer program products for decoding a vector of information symbols from a signal received through a transmission channel in a communication system with a reduced computational complexity. In particular, embodiments of the present invention provide methods, devices and computer program products for efficiently updating the radius for depth-first search strategy-based sequential decoders comprising the Sphere decoder.

Methods, devices and computer program products according to various embodiments of the invention may be implemented in various systems. In particular, methods, devices and computer program products according to the various embodiments of the invention may be implemented in communication systems to determine an estimate of a vector of information symbols conveyed from one or many transmitter devices to a receiver device.

The following description of certain embodiments of the invention will be made mainly with reference to communication systems, for illustration purpose only. However, the skilled person will readily understand that the various embodiments of the invention may be used in other applications.

Figure 1:
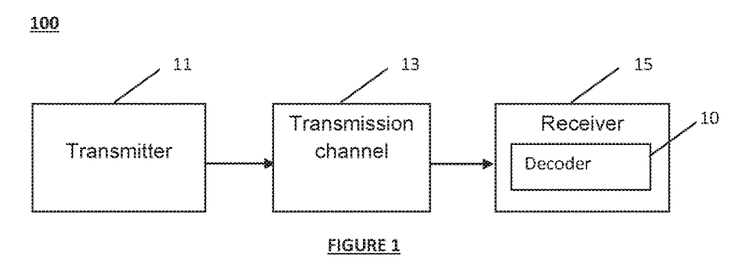
FIG. 1 is a schematic diagram of an exemplary application of the invention in communication systems.

Referring to FIG. 1, there is shown an exemplary application of the invention in a communication system 100. The communication system 100 may be wired, wireless or optical. It comprises at least one transmitter device 11 (also referred to hereinafter as a "transmitter") configured to transmit a plurality of information symbols to at least one receiver device 15 (also referred to hereinafter as "receiver") through a transmission channel 13. The receiver 15 may comprise a decoder 10 to decode the information symbols sent by one or more transmitter devices 11.

Transmitter devices 11 may be equipped with one or more transmit antennas and receiver devices 15 may be equipped with one or more receive antennas. The transmission channel 13 may be any wired connection, wireless medium or optical fiber-based link.

The communication system 100 may be a wireless single-user MIMO system in which a wireless multi-antenna transmitter device 11 communicates a flow of information symbols representing an input data with a wireless multi-antenna receiver device 15 configured to decode the conveyed symbols by the transmitter 11.

The communication system 100 may be a wireless multi-user MIMO system in which a plurality of wireless transmitter devices 11 and receiver devices 15 communicate with each other. In such embodiment, the communication system 100 may further use any multiple access technique such as TDMA, CDMA, FDMA, and SDMA.

The communication system 100 may be an optical fiber-based communication system. The received signal may accordingly correspond to the information symbols transmitted through the different polarization states of the optical fiber or propagating over the different modes of multi-mode fibers. In addition, a multiple access technique such as WDMA (Wavelength Division Multiple Access) may be used in such optical communication systems.

The transmission channel 13 may be any linear Additive White Gaussian Noise (AWGN) channel or a multipath channel using single-carrier or multi-carrier modulation formats such as OFDM and FBMC.

In an embodiment of the present invention, the complexity of depth-first tree-search-based sequential decoding of a signal received through a wireless single-user MIMO system may be reduced while providing optimal error performance. Exemplary applications of the decoding methods and devices according to the various embodiments of the invention include, with no limitation, MIMO decoding in configurations implementable in wireless standards such as the Wi-Fi (IEEE 802.11n), the cellular WiMax (IEEE 802.16e), the cooperative WiMax (IEEE 802.16j), the Long Term Evolution (LTE), the LTE-advanced and the 5G ongoing standardization.

For illustration purposes only, the following description will be made with reference to a wireless single-user MIMO system accommodating a transmitter device 11 equipped with $n_t \geq 1$ transmit antennas and a receiver device 15 equipped with $n_r \geq 1$ receive antennas for decoding information symbols sent by the transmitter 11. However, the skilled person will readily understand that the various embodiments of the invention apply in other communication systems such as wireless multi-user MIMO systems and optical MIMO systems. The invention may be integrated in any communication system characterized by a linear representation (equivalently a lattice representation) of the channel output at receiver devices. In addition, although the number of transmit and receive antennas are greater than one (1), various embodiments are particularly advantageous in the presence of a number of transmit antennas greater than or equal to two ($n_t \geq 2$) and a number of receive antennas greater than or equal to two ($n_r \geq 2$).

Figure 2:
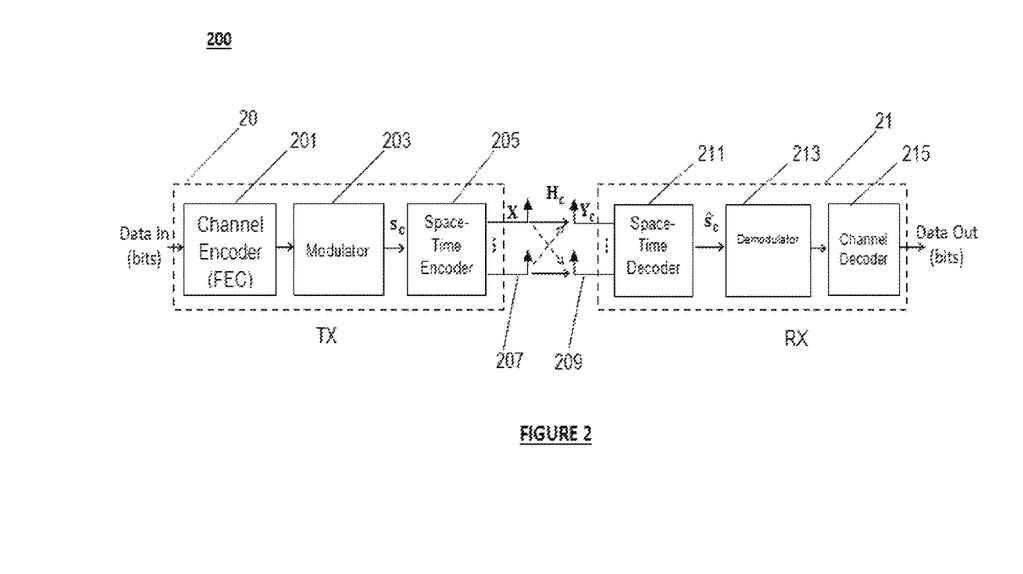
FIG. 2 is a schematic diagram of an implementation of a Space-Time decoder in a wireless single-user MIMO system.

Referring to FIG. 2, there is shown an exemplary wireless communication system 200 in which embodiments of the present invention may be implemented. The MIMO system may comprise a transmitter 20 implementing a Space Time Block Code (STBC) to encode and transmit the modulated information symbols over time and space dimensions. Each transmitter 20 of a station may exchange data with a receiver 21 of another station according to the wireless communication system 200.

The MIMO system may present a symmetric configuration. As used herein, a symmetric configuration refers to a configuration in which the transmitter and the receiver are equipped with the same number of antennas $n_t = n_r$. Alternatively, the MIMO configuration may be asymmetric, in which case the number $n_r$ of receive antennas differs from the number $n_t$ of transmit antennas. In particular, in order to avoid a rank deficiency problem, the number $n_r$ of receive antennas may be larger than the number $n_t$ of antennas at the transmitter.

The transmitter 20 can convey a signal to a receiver 21 over a noisy wireless MIMO channel. The transmitter 20 can be implemented in different devices or systems capable of operating in a wireless environment, such as user equipments or mobile stations. The transmitter 20 may be fixed or mobile. It may comprise for example:

a channel encoder 201 implementing a Forward Error Correction (FEC) code such as a block code or a convolutional code;

a modulator 203 implementing a modulation scheme such as Quadrature Amplitude Modulation (QAM) delivering a modulated symbol vector $s_c$;

a Space-Time encoder 205 for delivering a codeword matrix X;

$n_t$ transmit antennas 207, each transmit antenna being associated with an OFDM or FBMC modulator.

The transmitter 20 may be configured to encode a received flow of information bits as data input using a FEC encoder 201 implementing for example a convolutional code. The encoded binary signal may be then modulated into a symbol vector $s_c$ using the modulator 203. Different modulation schemes may be implemented such as $2^q$-QAM or $2^q$-PSK with $2^q$ symbols or states. The modulated vector $s_c$ may be a complex-value vector comprising κ complex-value symbols $s_1, s_2, \ldots, s_\kappa$ with q bits per symbol.

An information symbol $s_j$ has a mean power $E_s$, and can be written in the form:

$$s_j = Re(s_1) + iIm(s_j) \quad (1)$$

In equation (1), i denotes the complex number such that $i^2 = 1$ and the Re(.) and Im(.) operators output respectively the real and imaginary parts of an input value.

When modulation formats such as $2^q$-QAM are used, the $2^q$ symbols or states represent a sub-set of the integer field $\mathbb{Z}[i]$. The corresponding constellation is composed of $2^q$ points representing the different states or symbols. In addition, in the case of squared modulations, the real and imaginary parts of the information symbols belong to the same finite alphabet A=[-(q-1), (q-1)]. The minimum distance $d_{min}$ of a modulation scheme, represents the Euclidean distance between two adjacent points in the constellation and is equal to 2 in such an example.

A Space-Time Encoder 205 may be used to generate a codeword matrix X from the encoded symbols. The Space-Time encoder 205 may use a linear STBC of length T and may deliver a codeword matrix X of dimension $n_t \times T$ that belongs to a codebook C and is sent over T time slots. The coding rate of such codes is equal to $$\frac{\kappa}{T}$$

complex symbols per channel use, where κ is the number of encoded complex-value symbols composing the vector $s_c = [s_1, s_2, \ldots, s_\kappa]^t$ of dimension κ in this case. When full rate codes are used, the Space-Time Encoder 205 encodes $\kappa = n_t T$ complex-value symbols. Examples of STBCs are the Perfect Codes. Perfect codes provide full coding rates by encoding a number $\kappa = n_t^2$ ($T = n_t$) of complex information symbols and satisfy a non-vanishing determinant property.

The Space-Time Encoder 205 may use a spatial multiplexing scheme known as V-BLAST scheme by multiplexing the received complex-value information symbols over the different transmit antennas without performing a coding in the time dimension.

The codeword so constructed may be converted from the time domain to the frequency domain using a multicarrier modulation technique, using for example OFDM or FBMC modulators, and spread over the transmit antennas 207. Signals may be sent from the transmit antennas 207 optionally after filtering, frequency transposition and amplification.

The receiver 21 may be configured to receive and decode a signal communicated by the transmitter 20 in a wireless network through a transmission channel (also referred to as a "communication channel") subject to fading and interference and represented by a complex-value channel matrix $H_c$. In addition, the communication channel may be noisy, affected for example by additive Gaussian Noise.

The receiver 21 may be integrated in a base station such as a Node-B in a cellular network, an access point in a local area network or ad-hoc networks or any other interfacing device operating in a wireless environment. The receiver 21 may be fixed or mobile. In one exemplary embodiment, the receiver 21 may comprise:

a Space-Time decoder 211 configured to deliver, from the channel matrix $H_c$ and the channel output signal $Y_c$ an estimation $\hat{s}_c$ of the modulated symbol vector $s_c$;

a demodulator 213 configured to generate a binary sequence by performing a demodulation of the estimated symbol vector $\hat{s}_c$;

a channel decoder 215 configured to deliver as output a binary signal being an estimation of the transmitted bits using for example the Viterbi algorithm.

The receiver 21 implements a reverse processing of the processing performed in the transmitter 20. Accordingly, if a single-carrier modulation is used at the transmitter rather than a multi-carrier modulation, then the $n_r$ OFDM or FBMC demodulators may be replaced by corresponding single-carrier demodulators.

Figure 3:
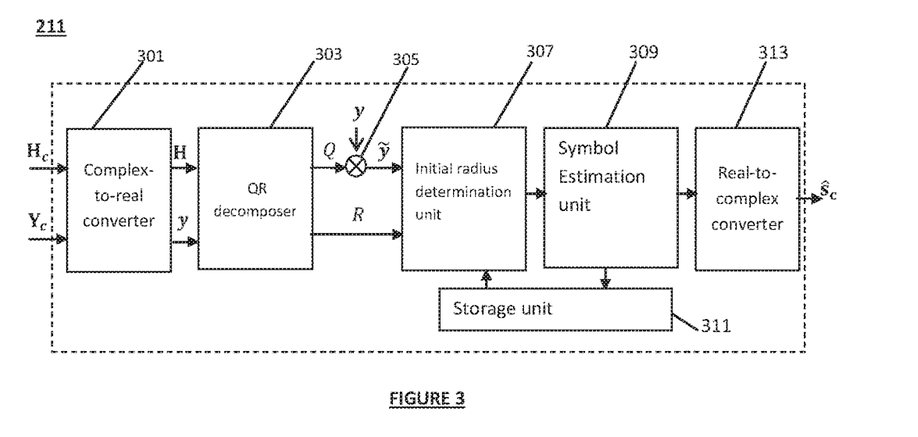
FIG. 3 is a block diagram illustrating a Space-Time decoder according to an exemplary embodiment of the invention.

Referring to FIG. 3, there is shown a Space-Time decoder 211 according to certain embodiments of the invention. Accordingly, the Space-Time decoder 211 may comprise a complex-to-real converter 301 configured to convert the complex-value channel matrix $H_c$ into a real-value equivalent channel matrix H, and convert the complex-value channel output $Y_c$ into a real-value vector y of dimension n. In accordance to the complex-to-real conversion of the received signal, the complex value vector $s_c$ comprising the modulated symbols may be converted into a real value vector s. The converted vector s comprises the real and imaginary parts of the original information symbols of complex values. The Space-Time decoder 211 may comprise a QR decomposer 303 configured to perform a QR decomposition of the real value channel matrix H in the form H=QR with Q being an orthogonal matrix (square matrix of dimensions n×n) and R being an upper triangular matrix. The Space-Time decoder 211 may further comprise a multiplication unit 305 configured to determine a modified real value signal ỹ by multiplying the real value vector y by the transpose of the orthogonal matrix Q. The Space-Time decoder 211 may further comprise:

an initial radius determination unit 307 configured to determine an initial radius for an initial search spherical region, a symbol estimation unit 309 configured to deliver an estimate $\hat{s}_{ML}$ of the real vector s according to the ML decoding criterion using ML sequential decoding. According to the various embodiments of the invention, the symbol estimation unit 309 may be configured to solve for the ML solution by performing an iterative search of a current lattice point inside a current spherical region. Each lattice point may be associated with a metric corresponding to the Euclidean distance between the lattice point and the real value received signal y. In a first iteration, the current sphere radius of the current spherical region may be set equal to the value of the initial radius determined by the initial radius determination unit 307.

According to some embodiments, the symbol estimation unit 309 may be configured to determine an update of the current radius by applying a linear function to the metric associated with the last found lattice point depending on whether a lattice point is found inside the current spherical region or not. More specifically:
- if a lattice point is found in the current spherical region, the symbol estimation unit 309 may be configured to apply the linear function to the metric associated with the found lattice point, which provides the updated current sphere radius,
- if no lattice point is found in the current spherical region, the symbol estimation unit 309 may be configured to apply the linear function to the sum of the metric associated with the last found lattice point and the value of the current radius, which provides the updated current sphere radius.

According to some embodiments, the linear function used to update the current sphere radius may be a linear function having a slope parameter α strictly inferior to one. The slope coefficient may be written in the form $$\alpha = \frac{1}{N}$$

with N being an integer number strictly greater than one (1). In a particular embodiment referred to as "dichotomy-based radius update", the slope parameter α may be advantageously equal to one half (½=0.5), i.e. N=2 enabling a fast convergence of the search of the ML solution and a computational complexity reduction.

According to one aspect of the invention, the Space-Time decoder 211 may comprise a storage unit 311 configured to store each found lattice point during the search for the ML solution with its Euclidean distance with respect to the real value received signal y.

According to some embodiments, the initial radius determination unit 307 may be configured to determine the initial sphere radius based on at least one parameter chosen in a group consisting of the noise variance of the channel additive noise and a predefined number of target lattice points.

According to certain embodiments, the predefined number of target lattice points may depend on the signal-to-noise ratio.

In an application of the invention to soft-output decoding, the predefined number of target lattice points may be determined based on at least one soft-output decision reliability metric.

The Space-Time decoder 211 may further comprise a real-to-complex converter 313 configured to deliver an estimate $\hat{s}_c$ of the vector of the complex-value information symbols by applying a real-to-complex conversion to the vector $\hat{s}_{ML}$ generated by the symbol estimation unit 309. The conversion operation is the inverse of the processing performed at the complex-to-real converter 301.

In one application of the present invention to a wireless Rayleigh fading multiple antenna system (wireless single-user MIMO) for decoding a signal sent from a transmitter equipped with $n_t$ transmit antennas using a spatial multiplexing scheme and $2^q$-QAM modulation, to a receiver equipped with $n_r$ receive antennas with $n_r \geq n_t$, the received complex-value signal may be written in the form:

$$y_c = H_c s_c + w_c \quad (2)$$

In equation (2), y, is a $n_r$-dimensional vector, $s_c$ denotes the complex-value vector of transmitted information symbols of dimension $n_t$. The complex-value $n_r \times n_t$ matrix $H_c$ represents the channel matrix comprising the fading gains. In a Rayleigh fading channel, the entries of the channel matrix H, are of independent identically distributed (i.i.d) complex Gaussian type. The channel matrix may be known or estimated in coherent transmissions at the receiver using estimation techniques such as least square estimators. In addition to the multipath fading effects, the transmission channel may be noisy. The noise may result from the thermal noise of the system components and intercepted interfering radiation by antennas. The total noise may be modeled by a zero-mean Additive White Gaussian Noise of variance $\sigma^2$ per real-value dimension modeled in equation (2) by the $n_r$-dimensional complex-value vector $w_c$.

Given the received complex-value signal, the receiver may attempt to generate an ML estimate of the original vector of information symbols.

Figure 4:
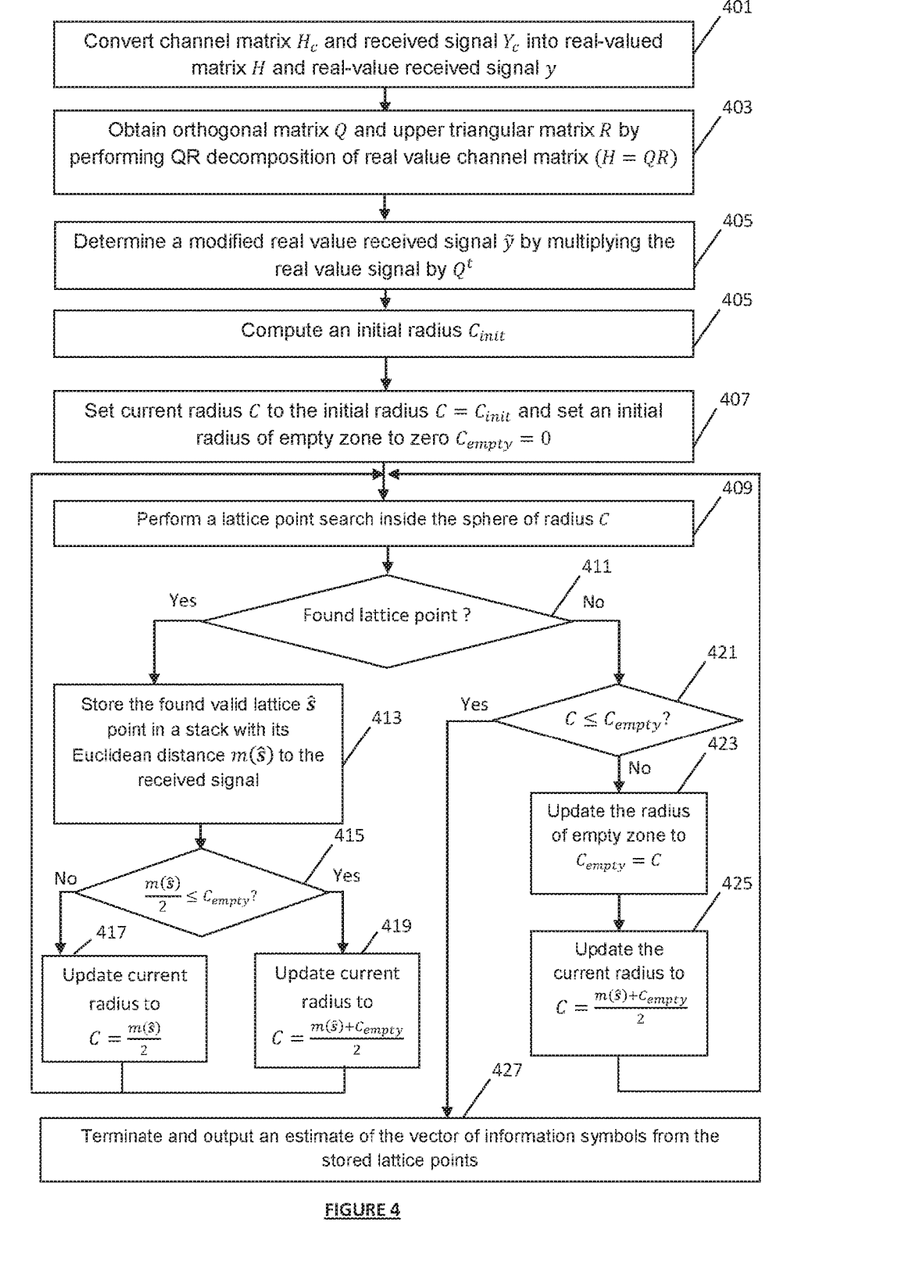
FIG. 4 is a flowchart illustrating a method of Sphere decoding according to certain embodiments of the invention.

FIG. 4 is a flowchart depicting the decoding method according to certain embodiments of invention based on ML sequential decoding using the Sphere decoder. The following description will be made with reference to a linear function for updating the sphere radius having a slope coefficient equal to α=½ (N=2), for illustration purposes only.

In step 401, a complex-to-real conversion may be performed to determine a real-value form of the received signal.

For example, in one embodiment using a spatial multiplexing scheme, the system in equation (2) may be transformed into:

$$y = \begin{bmatrix} \text{Re}(y_c) \\ \text{Im}(y_c) \end{bmatrix} = \begin{bmatrix} \text{Re}(H_c) & -\text{Im}(H_c) \\ \text{Im}(H_c) & \text{Re}(H_c) \end{bmatrix} \begin{bmatrix} \text{Re}(s_c) \\ \text{Im}(s_c) \end{bmatrix} + \begin{bmatrix} \text{Re}(w_c) \\ \text{Im}(w_c) \end{bmatrix} \quad (3)$$

The Re(.) and Im(.) operators in equation (3) designate the real and imaginary parts of each element composing the underlying vector or matrix.

Equation (3) can also be written in the form:

$$y = Hs + w \quad (4)$$

To facilitate the understanding of the following embodiments, the following description will be made with reference to a spatial multiplexing scheme involving a symmetric MIMO configuration where the transmitter and receiver are equipped with the same number of antennas $n_t = n_r$, for illustration purposes only. Accordingly, the real-value vectors y, s and w in equation (4) will be represented as n-dimensional vectors with $n = 2n_t = 2n_r$ and the equivalent real-value channel matrix H will be represented by a square n×n matrix. The vector $$s = \begin{bmatrix} \text{Re}(s_c) \\ \text{Im}(s_c) \end{bmatrix}$$

comprises the real and imaginary parts of the original complex information symbols composing the vector $s_c$. In embodiments where for example a $2^q$-QAM modulation is used, the components of the vector s belong to the same finite alphabet A=[−(q−1), (q−1)].

Given the integer nature of the vector s, any signal in the form x=Hs can be considered as a point from the n-dimensional lattice $\Lambda_H$ of a generator matrix the real value channel matrix H. Accordingly, the MIMO system in equation (4) may be associated with a lattice representation. Each possible value of the vector s comprising the real and imaginary parts of the original complex-value information symbols may be represented by a lattice point in the lattice $\Lambda_H$. Moreover, due to the presence of the noise vector w, the real value received signal y does not correspond to a lattice point. It may be seen as a point of the lattice $\Lambda_H$ disturbed by the noise vector w.

Lattices are by definition infinite, i.e. comprise infinity of lattice points. When modulations such as QAM are used, the set of the possible values of the vector of symbols s is finite and is determined by the finite alphabet A. In this case, the associated lattice points to the possible values of the vector s constitute a finite number of points in the lattice $\Lambda_H$. Such lattice points will be referred to in the following description as 'valid lattice points'.

According to the ML decoding criterion, the optimal estimate $\hat{s}_{ML}$ of the vector s is the solution of the optimization problem given by:

$$\hat{s}_{ML} = \operatorname{argmin}_{s \in A^n} \|y - Hs\|^2 \qquad (5)$$

Using the lattice representation of the MIMO system in equation (4), solving the ML decoding problem of equation (5) reduces to solve a closest vector problem in the lattice $\Lambda_H$. The ML solution corresponds in this case to the nearest lattice point to the received signal in the sense of the minimization of the Euclidean Distance.

For practical implementations, an equivalent tree representation of the MIMO system may be used. Therefore, a QR decomposition of the real value channel matrix H may be performed in step 403. An upper triangular matrix $R \in \mathbb{R}^{n \times n}$ and an orthogonal matrix $Q \in \mathbb{R}^{n \times n}$ maybe then obtained such that H=QR. Using the QR decomposition, equation (4) may be equivalently written as:

$$y = QRs + w \qquad (6)$$

Given the orthogonality of the matrix Q, an equivalent system to equation (6) may be determined in step 405 according to:

$$\tilde{y} = Q^t y = Rs + \tilde{w} \qquad (7)$$

In equation (7), $\tilde{w} = Q^t w$ stands for a modified noise vector, having the same statistical properties (same covariance matrix) as the noise vector w, given that the matrix Q is orthogonal. The system in equation (7) represents an equivalent representation of the MIMO system in equation (4). An equivalent lattice representation may be accordingly defined by the lattice $\Lambda_R$ of a generator matrix the upper triangular matrix R. The ML decoding problem in equation (5) may be accordingly expressed as:

$$\hat{s}_{ML} = \operatorname{argmin}_{s \in A^n} \|\tilde{y} - Rs\|^2 \qquad (8)$$

An ML metric may be defined by:

$$m(s) = \|\tilde{y} - Rs\|^2 \qquad (9)$$

Furthermore, given the upper triangular structure of the matrix R, a tree representation may be associated with the MIMO system of equation (7). The tree representation is defined by a decoding tree (hereinafter referred to as 'tree' or 'search tree'). A decoding tree is a graph data structure comprising a plurality of nodes, levels, branches and paths. More specifically, in correspondence with the MIMO system of equation (7), it comprises n levels where each level comprises at most card(A) nodes, with card(A) designating the carclinality of the finite alphabet A.

Nodes in the tree correspond to the different possible values of the real and imaginary parts of the complex value information symbols comprised in the vector s.

Levels correspond to the ranks of the decoded symbols in the vector s in a reverse order such that nodes located in the first level of the tree correspond to the last component of the vector of symbols s, the second level to the penultimate, and so on. By writing the vector $s = (s_1, s_2, \ldots, s_n)^t$, a node located at a level k in the tree corresponds to a possible value of the symbol $s_{n-k+1}$. Nodes located in the last level of the tree are termed leaf nodes and correspond to the possible values of the first symbol $s_1$.

Branches depart from a virtual node termed 'root node' and link nodes located in two consecutive levels. The root node may be denoted as $s_{root}$ or $s_{n+1}$. A branch denoted as $(s_{i+1}, s_i)$ corresponds to a connection between two nodes $s_{i+1}$ and $s_i$ located in the consecutive levels n-i and n-i+1. A branch connecting the root node to a node $s_n$ located at the first level of the tree is by convention denoted as $(S_{n+1}, S_n)$.

Each branch is associated with a cost function (also referred to hereinafter as 'partial metric' or 'partial Euclidean Distance'). The cost function associated to a branch $(s_{i+1}, s_i)$ may be defined using the ML metric by:

$$m(s_{i+1}, s_i) = |\tilde{y}_i - \sum_{j=i}^{n} R_{ij} s_j|^2 \qquad (10)$$

In equation (10), $\tilde{y}_i$ designates the $i^{th}$ component of the vector $\tilde{y}$ and $R_{ij}$ stands for the component of the upper triangular matrix R located in the $i^{th}$ row and $j^{th}$ column. The cost function associated with a branch $(s_{n+i}, s_n)$ starting at the root node is given by:

$$m(s_{n+1}, s_n) = |\tilde{y}_n - R_{nn} s_n|^2 \qquad (11)$$

Each node in the tree may be associated with a metric. Using the definition of the partial metrics of branches, a metric associated with a given node in the tree may be seen as a summation of the partial metrics of the different branches constituting the path from the root node to this given node. Accordingly, a metric associated with a node $s_{n-k+1}$ located at the level k may be expressed as:

$$m_k(s_{n-k+1}) = \sum_{i=n}^{n-k+1} m(s_{i+1}, s_i) = \sum_{i=n}^{n-k+1} |\tilde{y}_i - \sum_{j=i}^{n} R_{ij} s_j|^2 \qquad (12)$$

A path from the root node to a leaf node corresponds to a possible value $\hat{s}$ of the vector of symbols s. The associated metric to the leaf node corresponds to the Euclidean Distance between the equivalent received signal $\tilde{y}$ and the vector $x = R\hat{s}$ obtained using the vector $\hat{s}$.

According to the tree representation of the MIMO system, the ML estimation problem may be equivalently solved by performing a tree-search in the decoding tree. Accordingly, the ML solution corresponds to the path in the decoding tree resulting in the lowest metric.

a. The computational complexity of the tree-search is proportional to the number of visited nodes during the tree-search which depends on the number of nodes at each level and the total number of levels of the decoding tree. In order to reduce the number of examined nodes and hence reduce the decoding complexity, the Sphere decoder may be advantageously used. The Sphere decoder is based on a reduction of the number of visited nodes during the tree search by imposing search intervals for each level of the decoding tree. Only nodes that belong to these search intervals are examined while exploring the path with the lowest metric. Using the equivalent lattice representation of the MIMO system in equation (7), the reduction of the number of visited nodes may be equivalently seen as a reduction of the number of visited lattice points during the lattice search for the closest vector to the received signal. In particular, the Sphere decoder is based on a lattice search inside a spherical region $S_C$ of a given radius C centered at the point representing the real value received signal. The ML solution is accordingly determined by solving the optimization problem given by:

$$\hat{s}_{ML} = \operatorname{argmin}_{s \in A^n} \|\tilde{y} - Rs\|^2 \leq C \qquad (13)$$

An initial sphere radius $C_{init}$ may be determined in step 405. In one embodiment of the invention, the initial sphere radius may be determined based on the variance of the additive channel noise according to:

$$C_{init}=2n\sigma^2 \quad (14)$$

In another embodiment, the initial sphere radius may be determined taking into account the dynamics of the propagation channel and changes on the signal fading according to:

$$C_{init}=\min(\operatorname{diag}(H^tH)) \quad (15)$$

Given the determined initial radius, an initialization of the radius C and an initialization of a second radius $C_{empty}$ of a region termed 'empty zone' may be performed in step 407. The empty zone corresponds to a spherical region which does not comprise any valid lattice point. The radius C is the current radius defining a current spherical region $S_C$ considered to search valid lattice points. Accordingly, the current radius may be set equal to the determined initial radius as $C=C_{init}$. The radius of the empty zone may be initialized to zero ($C_{empty}=0$).

Steps 409 to 425 may be repeated iteratively to update the value of the current radius C to search a valid lattice point inside a current spherical region $S_C$.

In step 409, a lattice point search inside the current spherical region $S_C$ of a current radius C may be performed.

In order to perform the lattice point search, bound intervals $I_i=[I_i^{inf}, I_i^{sup}]$ for each node $s_i$ for $i=n, \ldots, 1$ determining the nodes to be explored at each level may be calculated. $I_i^{inf}$ designates the lower bound of the search interval while $I_i^{sup}$ corresponds to the upper bound of this search interval.

Two vectors defined by $\rho=H^{-1}y$ and $\xi=\rho-s$ may be first determined. Using these vectors, the spherical region constraint $\|\tilde{y}-Rs\|^2 \leq C$ in equation (13) may be equivalently expressed as $\|R\xi\|^2 \leq C$. Furthermore, using the notation $p_{ii}=R_{ii}^2$, $i=1, \ldots, n$;

$$p_{ij} = \frac{R_{ij}}{R_{ii}},$$

$j=i+1, \ldots, n$, the spherical region constraint may be also given by:

$$\sum_{i=1}^n p_{ii}|\xi_i+\sum_{j=i+1}^n p_{ij}\xi_j|^2 \leq C \quad (14)$$

Accordingly, the bound limits may be determined for the symbols $s_n, \ldots, s_1$ such that:

$$I_i^{inf} = \left\lceil -\sqrt{\frac{T_i}{p_{ii}}} + S_i \right\rceil, \quad (15)$$

$$I_i^{sup} = \left\lfloor \sqrt{\frac{T_i}{p_{ii}}} + S_i \right\rfloor, i=n, \ldots, 1$$

Where:

$$S_i=\rho_i+\sum_{j=i+1}^n p_{ij}\xi_j \quad (16)$$

$$T_i=C-\sum_{l=i+1}^n p_{ll}(\xi_l+\sum_{j=l+1}^n p_{lj}\xi_j)^2=T_{i-1}-p_{ii}(S_i-s_i) \quad (17)$$

The dependency between the value of the current radius C of the current spherical region $S_C$ inside which a valid lattice point is searched and the search intervals in the tree may be clearly noticed in the expressions of both lower and upper bounds in equations (15) and (17).

Further, according to certain embodiments using finite constellations such as in the presence of QAM modulations, additional constraints may be imposed on the bound limits to guarantee that a valid lattice point is being searched for inside the current spherical region. First, a scaled version of the finite alphabet A may be determined such that the alphabet may be expressed in the form $A=[c_{min}, c_{max}]$. Accordingly, when $2^q$-QAM modulations are used, the bound limits of the search intervals in equation (15) may be further given by:

$$I_i^{inf} = \max\left(\left\lceil -\sqrt{\frac{T_i}{p_{ii}}} + S_i \right\rceil, c_{min}\right), \quad (18)$$

$$I_i^{sup} = \min\left(\left\lfloor \sqrt{\frac{T_i}{p_{ii}}} + S_i \right\rfloor, c_{max}\right), i=n, \ldots, 1$$

Given the determined search intervals, a search for a valid lattice point inside the current spherical region $S_C$ may be realized by exploring the search intervals in the tree to find a path corresponding to a vector $\hat{s}=(s_1, \ldots, s_n)^t$ such that all its components belong to the search intervals.

If it is determined in step 411 that a valid lattice point is found inside the current spherical region $S_C$, steps 413 to 419 may be performed to determine an updated value of the current radius to be considered in the following iteration for searching for a new valid lattice point inside an updated current spherical region.

According to some embodiments, the update of the current sphere radius may be determined by applying a linear function $f(.)$ to the metric associated with the found lattice point. In such embodiments, first step 413 may be performed to store the found valid lattice points in a stack with its Euclidean Distance to the received signal. Using the definition of the ML metric in equation (9), the Euclidean Distance between the found valid lattice points and the received signal may be determined according to $m(\hat{s})=\|\tilde{y}-R\hat{s}\|^2$.

Given the stored value of the Euclidean Distance of the found valid lattice point, the current radius may be updated in step 417 or step 419 in response to a comparison performed in step 415.

In certain embodiments, the linear function $f(.)$ used to update the current radius may be defined by a slope parameter $$\alpha = \frac{1}{N} < 1$$

where the coefficient N being greater than or equal to 2. Particularly, in an embodiment referred to as "dichotomy-based radius update", the coefficient N may be equal to two (2) providing a linear function $f(.)$ consisting of a division by 2.

Accordingly, if it is determined in step 415 that $$f(m(\hat{s})) = \frac{m(\hat{s})}{2} > C_{empty},$$

then the current radius may be updated in step 417 according to:

$$C = \frac{m(\hat{s})}{2} \quad (19)$$

Alternatively, if it is determined in step 415 that $$f(m(\hat{s})) = \frac{m(\hat{s})}{2} \leq C_{empty},$$

then the current radius may be updated in step 419 according to:

$$C = \frac{m(\hat{s}) + C_{empty}}{2} \quad (20)$$

If it is determined in step 411 that no valid lattice point is found inside the current spherical region $\mathcal{S}_C$, steps 421 to 425 may be performed to determine an updated value of the current radius to be alternatively considered for searching for a valid lattice point inside an updated current spherical region. Accordingly, step 421 may be first performed to compare the radius C of the current spherical region $\mathcal{S}_C$ to the last value of the empty zone $C_{empty}$.

If it is determined in step 421 that $C > C_{empty}$, it means that the current spherical region $\mathcal{S}_C$ is not an empty zone and may comprise at least one valid lattice point. In this case, step 423 may be performed to update the radius of the empty zone to $C_{empty} = C$. Step 425 may be subsequently performed to update the current radius by applying the linear function $f(.)$ to the sum of the updated radius of the empty zone and the metric of the last found valid point $m(\hat{s})$. In a particular embodiment using a slope coefficient $\alpha = \frac{1}{2}$, the updated current radius may be given by:

$$C = \frac{m(\hat{s}) + C_{empty}}{2} \quad (21)$$

If it is determined in step 421 that $C \leq C_{empty}$, it means that the currently considered spherical region $\mathcal{S}_C$ is smaller than the empty zone and thus does not comprise any valid lattice point. This means that the ML estimate is found and corresponds to the last found valid lattice point stored in the stack. In this case, step 427 may be performed to terminate the decoding process and output the ML estimate $\hat{s}_{ML}$ of the vector s. The ML estimate corresponds to the last found valid lattice point during the lattice points search.

Figure 5:
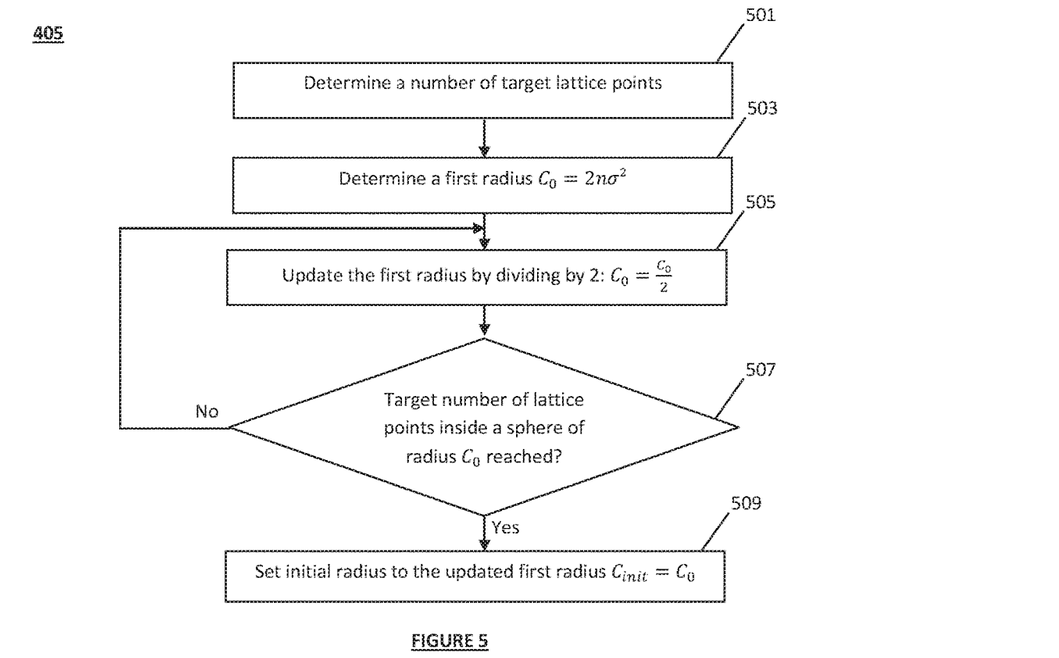
FIG. 5 is a flowchart depicting a method for initial radius calculation for the Sphere decoder according to certain embodiments of the invention.

FIG. 5 is a flowchart illustrating a method for determining the initial radius $C_{init}$ of step 405 according to certain embodiments of the invention. In such embodiments, in addition to the noise statistics, the initial radius may be determined such that a predefined target number of lattice points to be visited during the search for the ML solution can be reached. The linear function $f(.)$ previously used to update the value of the current sphere radius may be used in certain embodiments to determine the initial radius $C_{init}$. The following description will be made with reference to a linear function defined by a slope parameter equal to $\frac{1}{2}$, for illustration purposes only.

Step 501 may be performed to determine a number of target lattice points. In particular embodiments using finite constellations, a number $N_p$ of target valid lattice points may be determined in step 501.

In some embodiments, the number of target lattice points may depend on the signal-to-noise ratio.

In some embodiments in application to soft-output decoding, the number of target lattice points may be determined based on at least one soft-output decision reliability metric.

In step 503, a first radius $C_0 = 2n\sigma^2$ may be determined such that the spherical region $\mathcal{S}_{C_0}$ of radius equal to $C_0$ comprises at least one lattice point with a high probability.

Step 505 and step 507 may be iteratively performed to update the value of the first radius $C_0$ until reaching the target number of lattice points inside a sphere of radius $C_0$. In step 505, an update of the current value of the first radius $C_0$ may be performed using the linear function $f(.)$. According to certain embodiments, the updated first radius may be given by $C_0 = C_0/2$.

If it is determined in step 507 that the target number $N_p$ of lattice points is reached, the initial radius $C_{init}$ may be determined in step 509 and set to the last updated value of the first radius $C_0$.

In certain embodiments, determining if the number $N_p$ of target lattice points inside a spherical region of radius $C_0$ is reached in step 507 may be performed using the following relationship:

$$C_0 \approx \left( \frac{N_p \times vol(\Lambda_R)}{v_n} \right)^{1/n} \quad (22)$$

In equation (22), $vol(\Lambda_R) = vol(\Lambda_H) = |det(H)| = |det(R)|$ designates the fundamental volume of the lattice $\Lambda_H$ and equivalently of the lattice $\Lambda_R$. $V_n$ stands for the volume of a sphere of a unit radius in the real space $\mathbb{R}^n$ and given by $$v_n = \frac{\pi^n}{n!}.$$

In particular embodiments using finite constellations, determining if the target number of valid lattice points is reached in step 507 may be performed using the expression given by:

$$C_0 \approx \left( \frac{\beta^n N_p \times vol(\Lambda_R)}{v_n} \right)^{1/n} \quad (23)$$

In equation (23), the coefficient) $\beta$ depends on the used modulation. For example, for the case of 4-QAM modulations, $\beta = \frac{3}{2}$, for 16-QAM modulations, $\beta = \frac{3}{4}$, and for 64-QAM modulations, $\beta = \frac{3}{8}$.

Figure 6:
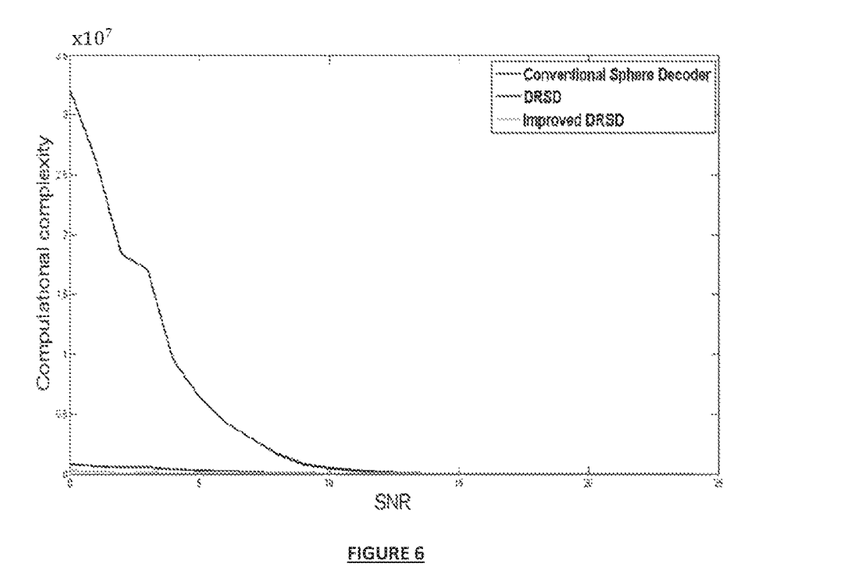
FIG. 6 is a diagram illustrating the total computational complexity obtained in a 8×8 MIMO communication system using a spatial multiplexing and 16-QAM modulations, and comprising a Sphere decoder according to certain embodiments of the invention.

FIG. 6 illustrates the computational complexity in terms of the number of multiplications, as function of the signal-to-noise ratio, obtained in the case of an 8×8 MIMO system using spatial multiplexing and 16-QAM modulations. The computational complexity is evaluated for three different implementations of the Sphere decoder: 'the conventional sphere decoder' refers to the Sphere decoding using the classical radius update method. 'DRSD' refers to Sphere decoding using the sphere radius update according to certain embodiments of the invention where the slope parameter of the linear function used to update the radius of the current spherical region is equal to ½. And 'Improved DRSD' refers to Sphere decoding according to a particular embodiment where the initial sphere radius is determined based on a target number of valid lattice points according to equation (23). Numerical results show that using the radius update according to the various embodiments of the invention provides a significant reduction in the computational complexity. The complexity gain with respect to Sphere decoding using the classical radius update method reaches 90% for a signal-to-noise ratio varying between 0 dB and 6 dB in the decibel scale and is almost equal to 75% at a signal-to-noise ratio equal to 15 dB.

Figure 7:
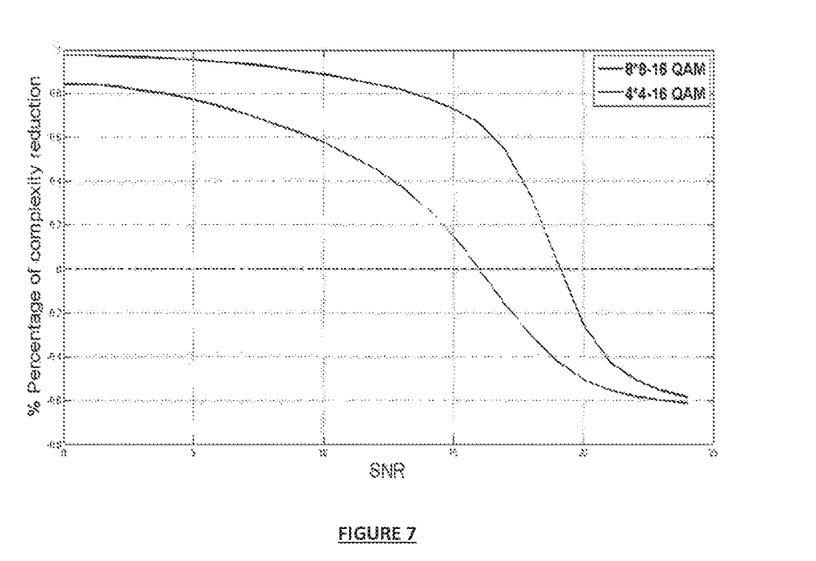
FIG. 7 is a diagram illustrating the percentage of the computational complexity reduction of the Sphere decoder according to certain embodiments of the invention over the classical SD obtained in a 4×4 MIMO communication system using a spatial multiplexing and 16-QAM modulations.

FIG. 7 illustrates the percentage on the complexity reduction, as function of the signal-to-noise ratio, of the 'DRSD' decoding scheme over the 'conventional sphere decoder' in two symmetric MIMO configurations using respectively 4 and 8 antennas at each of the transmitter and the receiver. Further, the complexity reduction is evaluated in the case of 16-QAM modulations. Depicted results show that the complexity reduction depends on the number of antennas in the MIMO system. In particular, the complexity reduction increases as function of the number of antennas deployed at the transmitter and the receiver.

Figure 8:
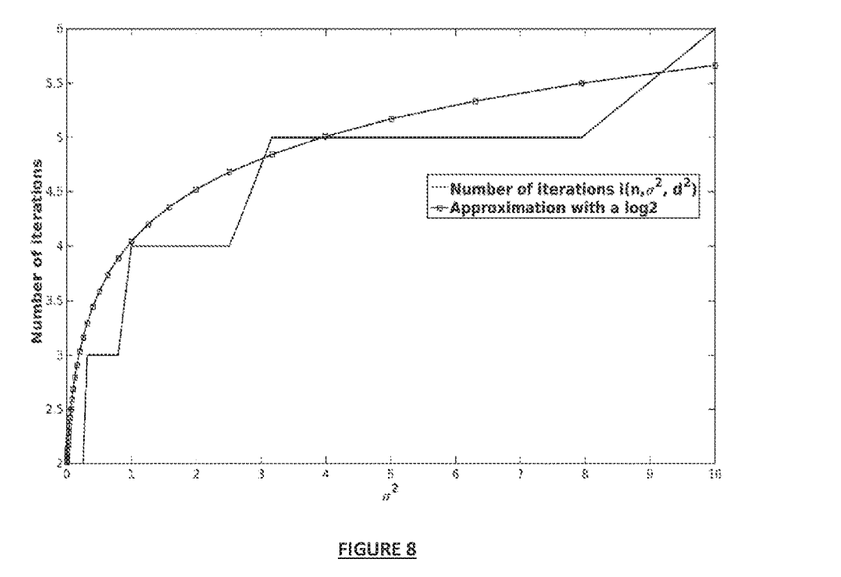
FIG. 8 is a diagram illustrating an approximation of the number of visited lattice points obtained with the Sphere decoder according to certain embodiments of the invention in a 8×8 MIMO communication system using a spatial multiplexing and 16-QAM modulations.

FIG. 8 illustrates the number of visited lattice points obtained using the Sphere decoder according to certain embodiments implementing a dichotomy-based radius update (referred to in the legend as "Number of iterations $i(n, \sigma^2, d^2=C)$") and an approximation with a logarithmic function. The number of iterations denoted by $i(n, \sigma^2, d^2=C)$ is accordingly approximated with the logarithmic function given by:

$$g(i)=0.5 \times \log_2(1+2n\sigma^2)+2 \qquad (24)$$

The complexity of the DRSD decoding scheme denoted by $C_{DRSD}$ is accordingly approximated by:

$$C_{DRSD} \approx (4n^2+28n) \times i(n,\sigma^2,d^2=C) \qquad (25)$$

The approximation of the computational complexity in equation (25) gives an order of the computational complexity of the Sphere decoding algorithm according to certain embodiments using a dichotomy-based radius update. The computational complexity is accordingly in the order of $O(n^2)$. While the computational complexity of the Sphere decoding algorithm using the classical sphere radius update is in the order of $O(n^3)$.

Using equation (25), the fraction (ratio), denoted by $$R_{approx} = \frac{C_{DRSD}}{C_{SD}},$$

between the computational complexity obtained using the DRSD and the computational complexity obtained using the classical Sphere decoder may be approximated as:

$$R_{approx} \approx (4n^2 28n) \times i(n,\sigma^2,d^2=C)/\Sigma_{k=1}{}^n F_p(k)N(k,\sigma^2,d^2=C) \qquad (26)$$

In equation (26), $F_p(k)$ designates the number of elementary computational operations (multiplications, additions, square roots, etc) per visited lattice point. $N(k, \sigma^2, d^2=C)$ designates a theoretical approximation of the number of lattice points comprised in a k-dimensional sphere of radius $d^2=C$.

Figure 9:
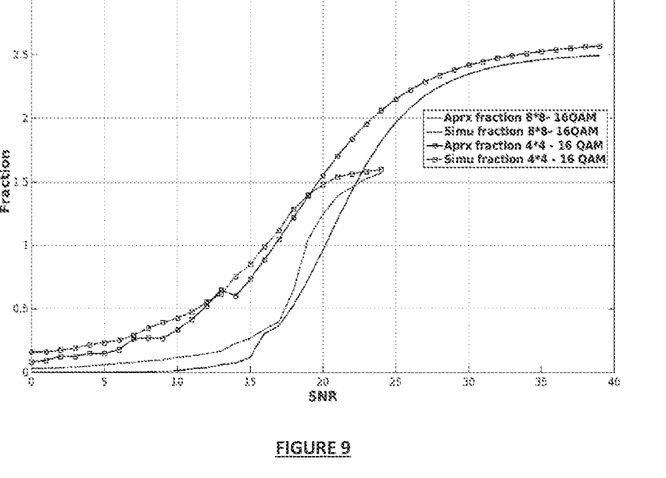
FIG. 9 is a diagram illustrating an approximation of the fraction between the computational complexity obtained with the Sphere decoder according to certain embodiments of the invention and the computational complexity obtained using the classical Sphere decoder.

FIG. 9 illustrates numerical results on the approximation of the fraction between the computational complexity obtained using the Sphere decoder implementing a dichotomy-based radius update and the computational complexity obtained using the classical Sphere decoder based on the classical radius update technique. Simulation results (referred to in the legend as "Simu fraction") and theoretical results (referred to in the legend as "Aprx fraction") are evaluated for 4×4 and 8×8 MIMO systems using 16-QAM modulations. The theoretical results are derived using the approximation in equation (26). Plotted results show the accuracy of the theoretical approximation and validate the variation of the computational complexity of the DRSD in the order of $O(n^2)$.

Although the various embodiments of the invention have been detailed in the case of MIMO systems using spatial multiplexing of information symbols, it should be noted that the invention is also applicable in configurations using linear Space-Time Block codes. In the presence of a Space-Time Block code of length T and encoding κ symbols, the real-value expression of the channel output can be written in the lattice representation form of equation (4) where the equivalent channel matrix is the real-value $2n_rT \times 2\kappa$ matrix $H_{eq}$ given by:

$$H_{eq}=(I_T \otimes H)G \qquad (27)$$

The $2n_rT \times 2\kappa$ matrix G designates a real-value matrix known as a generator matrix or coding matrix of the linear Space-Time Block code. $I_T$ denotes the identity matrix of dimension T and the operator $\otimes$ is the Kronecker matrices product.

Furthermore, while the various embodiments of the invention were detailed for symmetric MIMO configurations characterized by a same number of transmit and receive antennas, it should be noted that the invention may also be applied in asymmetric MIMO configurations with $n_t < n_r$. A lattice representation in the form of equation (4) can also be obtained by performing the complex-to-real conversion of step 701 to the equivalent system given by:

$$U^\dagger y_c = DV^\dagger s_c + U^\dagger w_c \qquad (28)$$

In equation (26), the matrices U and V are unitary matrices obtained, together with matrix D, from the singular value decomposition of the matrix $H_c=UDV^t$. D is a diagonal matrix having positive diagonal entries representing the singular values of the matrix $H_c$. The superscript $(.)^\dagger$ designates the Hermitian transpose operator.

Further, the various embodiments of the invention have been described with reference to Sphere decoding based on a QR decomposition of the real value channel matrix. However, it should be noted that the various embodiments apply to any preprocessed channel matrix prior to performing the QR decomposition. Several preprocessing techniques may be implemented separately or combined. Exemplary preprocessing techniques comprise permuting the rows and/or columns of the channel matrix, performing a lattice reduction and filtering using the Minimum Mean Square Error-Generalized Decision Feedback Equalizer (MMSE-GDFE).

Further, the various embodiments of the invention are not limited to particular types of decoding and apply both to hard-output and soft-output decoding.

In one application to soft-output decoding, methods and devices according to the various embodiments of the invention allow generating a list of estimates of the original vector of information symbols. The list thus obtained can be used to calculate the log likelihood ratio values for approximating the extrinsic information of the different information bits carried by the original information symbols. The list of estimates may be filled from the stored valid lattice points during the search for the ML solution.

The methods and devices described herein may be implemented by various means. For example, these techniques may be implemented in hardware, software, or a combination thereof. For a hardware implementation, the processing elements of a Space-Time decoder 211 can be implemented for example according to a hardware-only configuration (for example, in one or more FPGA, ASIC or VLSI integrated circuits with the corresponding memory) or according to a configuration using both VLSI and DSP.

Figure 10:
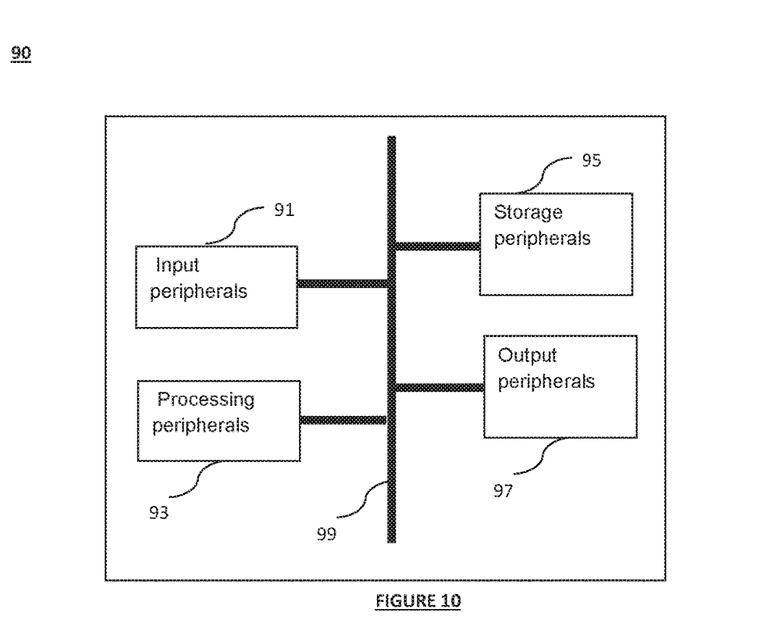
FIG. 10 illustrates a hardware architecture of a Space-Time decoder according to certain embodiments of the invention.

FIG. 10 represents an exemplary hardware architecture 90 of the Space-Time decoder 211 according to certain embodiments of the invention. The hardware architecture 90 may be implemented in a machine or a computer executed device. As illustrated, the Space-Time decoder 211 may include various computing, storage and communication units possibly interacting with one another through a data and address port 99 and comprising:

- Input peripherals 91 for receiving for example input data from the receive antennas 209;
- Processing peripherals 93 comprising one or more microprocessors (CPU) such as an FPGA or an ASIC configured for example to execute the corresponding instructions to run the methods and algorithms according to the various embodiments of the invention;
- Storage peripherals 95 possibly comprising a random access memory (RAM) or a read-only memory to store for example the found lattice points during the search for the ML solution and the target number of lattice points.
- Output peripherals 97 comprising communication means such as displays enabling for example man-to-machine interaction between the receiver device 21 and a MIMO system administrator for configuration and maintenance purposes.

Further, while certain embodiments of the invention have been described in relation to a wireless single-user MIMO system, it should be noted that the invention is not limited to such application. The invention may be integrated in any receiver device operating in any linear communication system characterized by a linear representation of the channel output. The communication system may be wired, wireless or optical fiber-based accommodating single or multiple users, using single or multiple antennas and single or multi-carrier communication technique. For instance, the present invention may be integrated in a receiver device implemented in a wireless distributed MIMO system. Distributed MIMO may be used for example in cellular communications applied in 3G, 4G, LTE and 5G and future standards. Cooperative communications applied for example in ad-hoc networks (wireless sensor networks, machine-to-machine communications, internet of things . . . ) are also examples of distributed MIMO systems. In addition to wireless networks, the present invention may be integrated in optical receiver devices implemented in optical fiber-based communication systems such as Polarization Division Multiplexing-OFDM (PDM-OFDM) systems.

Further, the invention is not limited to communication devices and may be integrated in signal processing devices such as electronic filters of finite impulse response (FIR) used in audio applications like audio crossovers and audio mastering. Accordingly, certain embodiments of the invention may be used to determine an estimate of an input sequence, given an output sequence of a FIR filter of order M.

Furthermore, the methods described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions specified herein.

While embodiments of the invention have been illustrated by a description of various examples, and while these embodiments have been described in considerable detail, it is not the intent of the applicant to restrict or in any way limit the scope of the appended claims to such details. Additional domains and embodiments will readily appear to those skilled in the art. The invention in its broader aspects is therefore not limited to the specific details, representative methods, and illustrative examples shown and described.

The invention claimed is:

1. A decoder for decoding a signal received through a transmission channel in a communication system, said signal comprising a vector of information symbols, said transmission channel being represented by a channel matrix, wherein the decoder comprises:
   an initial radius determination unit configured to determine an initial radius based on at least one parameter chosen in a group consisting of a noise variance and a predefined number of target lattice points;
   a symbol estimation unit configured to iteratively determine a current radius to search a lattice point inside a current spherical region defined by said current radius, said current radius being initially set to said initial radius, said symbol estimation unit being configured, for each lattice point found in said current spherical region, to store said lattice point in association with a metric, said symbol estimation unit being further configured to update said current radius by applying a linear function to said metric, said linear function having a slope parameter strictly inferior to one,
   wherein the decoder is configured to determine at least one estimate of said vector of information symbols from at least one of the lattice points stored by the symbol estimation unit.

2. The decoder of claim 1, wherein said symbol estimation unit is configured to update said current radius in response to finding a lattice point in the current spherical region, said linear function being a function of the metric associated with the found lattice point.

3. The decoder of claim 1, wherein said symbol estimation unit is configured to apply said linear function to the sum of the metric associated with the last found lattice point and the value of said current radius if no lattice point is found in the current spherical region.

4. The decoder of claim 3, wherein it further comprises a storage unit configured to store each found lattice point.

5. The decoder of claim 4, wherein the metric associated with a lattice point is determined from the Euclidean distance between said signal and said lattice point.

6. The decoder of claim 1, wherein said predefined number of target lattice points is determined based on the signal-to-noise ratio.

7. The decoder of claim 6, wherein said number of target lattice points is further determined based on at least one reliability metric associated with said log-likelihood ratio values.

8. The decoder of claim 1, wherein said information symbols carry information bits, said decoder being further configured to determine log-likelihood ratio values on said information bits from said lattice points stored in said storage unit.

9. The decoder of claim 8, wherein said number of target lattice points is further determined based on at least one reliability metric associated with said log-likelihood ratio values.

10. The decoder of claim 1, wherein said symbol estimation unit being configured to search a lattice point inside a current spherical region defined by said current radius using a sequential decoding algorithm and an upper triangular matrix determined by performing a QR decomposition of said channel matrix.

11. The decoder of claim 10, wherein it is further configured to perform a preprocessing on said channel matrix.

12. The decoder of claim 11, wherein said preprocessing is chosen in a group consisting of a permutation of rows and/or columns, a lattice reduction and MMSE-GDFE filtering.

13. A receiver for receiving and decoding a vector of information symbols, wherein the receiver comprises a decoder configured to decode said vector of information symbols, said decoder comprises:
an initial radius determination unit configured to determine an initial radius based on at least one parameter chosen in a group consisting of a noise variance and a predefined number of target lattice points;
a symbol estimation unit configured to iteratively determine a current radius to search a lattice point inside a current spherical region defined by said current radius, said current radius being initially set to said initial radius, said symbol estimation unit being configured, for each lattice point found in said current spherical region, to store said lattice point in association with a metric, said symbol estimation unit being further configured to update said current radius by applying a linear function to said metric, said linear function having a slope parameter strictly inferior to one,
wherein the decoder is configured to determine at least one estimate of said vector of information symbols from at least one of the lattice points stored by the symbol estimation unit.

14. A wireless device configured to receive data in a wireless multiple-input multiple-output communication system, wherein the wireless device comprises a receiver according to claim 13.

15. An optical device configured to receive data in an optical multiple-input multiple-output communication system, wherein the optical device comprises a receiver according to claim 13.

16. A method of decoding a signal received through a transmission channel in a communication system, said signal comprising a vector of information symbols, said transmission channel being represented by a channel matrix, wherein said method comprises:
determining an initial radius based on at least one parameter chosen in a group consisting of a noise variance and a predefined number of target lattice points;
iteratively determining a current radius to search a lattice point inside a current spherical region defined by said current radius, said current radius being initially set to said initial radius, said method comprising, for each lattice point found in said current spherical region, storing said lattice point in association with a metric,
wherein said method comprises updating said current radius by applying a linear function to said metric, said linear function having a slope parameter strictly inferior to one, said method further comprising determining at least one estimate of said vector of information symbols from at least one of the stored lattice points.

17. A computer program product for decoding a signal received through a transmission channel in a communication system, said signal comprising a vector of information symbols, said transmission channel being represented by a channel matrix, the computer program product comprising:
a non-transitory computer readable storage medium, and instructions stored on the non-transitory computer readable storage medium that, when executed by a processor, cause the processor to:
determine an initial radius based on at least one parameter chosen in a group consisting of a noise variance and a predefined number of target lattice points;
iteratively determine a current radius to search a lattice point inside a current spherical region defined by said current radius, said current radius being initially set to said initial radius, said computer program product being caused, for each lattice point found in said spherical region, to store said lattice point in association with a metric, processor being further caused to update said current radius using a linear function, said linear function having a slope parameter strictly inferior to one,
wherein said processor being caused to determine at least one estimate of said vector of information symbols from at least one of the stored lattice points.

* * * * *